United States Patent

[11] 3,627,901

[72] Inventor Marvin B. Happ
Hingham, Mass.
[21] Appl. No. 886,614
[22] Filed Dec. 19, 1969
[45] Patented Dec. 14, 1971
[73] Assignee Texas Instruments Incorporated
Dallas, Tex.

[54] COMPOSITE ELECTRONIC DEVICE PACKAGE-CONNECTOR UNIT
29 Claims, 11 Drawing Figs.

[52] U.S. Cl. 174/52 PE, 29/193, 29/193.5, 29/588, 174/DIG. 3, 174/525, 317/234 E, 317/234 N
[51] Int. Cl. H05k 5/00
[50] Field of Search 174/52.5, 52.6, 50.5 FP; 317/101 A, 101 CP, 234 (4), 234 (5), 234 (5.4); 29/588-590, 577, 193, 193.5

[56] References Cited

UNITED STATES PATENTS

| | | | |
|---|---|---|---|
| 3,265,806 | 8/1966 | Burk et al. | 174/DIG. 3 |
| 3,436,810 | 4/1969 | Kauffman | 174/52 PE |
| 3,440,027 | 4/1969 | Hugle | 174/DIG. 3 |
| 3,484,533 | 12/1969 | Kauffman | 174/DIG. 3 |
| 3,509,430 | 4/1970 | Mroz | 174/DIG. 3 |

*Primary Examiner*—Darrell L. Clay
*Attorneys*—Harold Levine, Edward J. Connors, Jr., John A. Haug, James P. McAndrews and Gerald B. Epstein

ABSTRACT: An integral combination package and connector unit for electronic devices including a plurality of spaced lead members having inner ends defining a plurality of terminal members, which are adapted for connection to the electronic device, and outer ends, terminating in aligned spaced relationship and joined with a plurality of male connector pins of a substantially greater thickness. The male connector pins depend from the outer ends of the lead members in aligned parallel relationship and are adapted to be connected in an electronic system. A nonconductive encapsulation material encapsulates the lead members and may encapsulate a portion of the male connector pins, although the ends thereof are exposed for connection to the electronic system. A cavity in the encapsulation material exposes the terminal members to permit connection of an electronic device to the terminal members, the cavity being adapted to receive a sealant plug to complete the unit.

Inventor,
Marvin B. Happ,
by Gerald B. Epstein Att'y.

Inventor,
Marvin B. Happ,
by Gerald B. Epstein Att'y.

Inventor,
Marvin B. Happ,
by Gerald B. Epstein Att'y.

Inventor,
Marvin B. Happ,
by Gerald B. Epstein Att'y.

Inventor,
Marvin B. Happ,
by Gerald B. Epstein Att'y.

Inventor,
Marvin B. Happ,
by Gerald B. Epstein Att'y.

COMPOSITE ELECTRONIC DEVICE PACKAGE-CONNECTOR UNIT

The present invention relates generally to packaging of electronic devices and more particularly is directed to a miniaturized integral package and connector unit for microminiaturized electronic devices.

In most instances, microminiaturized electronic devices, such as semiconductor devices, including various types of integrated circuits, are suitably packaged in a lead frame structure to permit interconnection with other similar devices and/or for interconnection in an electronic system. Frequently, such lead frame structures are arranged to be connected to a separate connector structure, which in turn, is adapted to be connected in an electronic system. For example, the connector structure may be designed for insertion in a printed circuit board, which serves to interconnect a plurality of such devices.

Typically, a semiconductor device, such as an integrated circuit, includes a plurality of circuit elements, and various of these circuit elements may be electrically connected to the coplanar terminal portions of a miniaturized lead frame structure. The terminal portions are an integral part of lead members, extending from opposed portions of the lead frame. The terminal portions of the lead frame structure and the semiconductor device may be protected by the provision of a suitable header structure or, alternatively, may be encapsulated in an electrical insulation material to protect the semiconductor device from contamination. This type of arrangement is conventionally referred to as a flat-pack. Such structures are often modified by effecting a right-angle bend at each of the lead members in order to form two rows of parallel aligned lead members, the resultant configuration being conventionally referred to as a dual-in-line package. These lead members are then adapted for insertion into female receptacles in a connector unit.

The connector unit typically includes a pair of parallel rows of openings or receptacles which are adapted for registration with the male lead members of the dual-in-line package, while associated male conductors in electrical contact with the openings extend from a surface of the connector unit opposite to that at which the female receptacles are provided. In order to provide increased durability the male conductors are generally substantially thicker and of greater structural strength than the lead members of the dual-in-line structure so that they may be conveniently inserted in a printed circuit board, in an electronic system, etc. and are also adapted for subsequent wire wrap interconnection operations which necessitates a high, mechanical-strength structure. The lead members of the dual-in-line structure, of course, need not have this degree of structural strength since they are merely received in the female receptacles of the connector unit and are not subjected to significant mechanical stress.

However, it may be readily appreciated that the foregoing described structural arrangement may lead to substantial inefficiencies in manufacture as well as in the fabrication of an electronic system. More particularly, inefficiencies are introduced by virtue of the separate fabrication of the dual-in-line package structure and the connector unit, although these structures mate with each other and thus have numerous similar characteristics. Similarly, a substantial inefficiency is introduced by the additional step required for insertion of the lead members in the female receptacles provided in the connector unit. Also, separate testing of the dual-in-line package and the connector unit are often required in order to assure the proper electrical performance of each unit separately, as well as when interconnected. In addition, the interconnected package and connector unit have suffered problems of reliability in certain instances.

Accordingly, it is an object of the present invention to provide a combined package and connector for electronic devices.

It is another object of the present invention to provide an integral electronic device package and connector unit integrally formed from a single unit of material.

It is still another object of the present invention to provide an integral unitary package and connector unit having a high degree of reliability for electronic devices.

It is a further object of the present invention to provide a combined integral package and connector unit for semiconductor devices which may be efficiently fabricated and which is extremely versatile and durable in use.

Various additional objects and advantages will be readily apparent from the following detailed description and accompanying drawings wherein.

Very generally, in accordance with the principles of the present invention, the conventional lead frame structure package typically utilized for packaging semiconductor devices, such as integrated circuits, and then plugged into a connector unit adapted to be connected to a printed circuit board or the like is replaced by an integral combination unit. The combination unit includes a partial lead frame assembly for supporting a semiconductor device and integrally connected conductor pins similar to those of a conventional connector unit. The composite integral unit thus provided eliminates the necessity for a separately formed lead frame structure and connector unit, which are subsequently interconnected prior to disposition in an electronic system.

Figure 1:
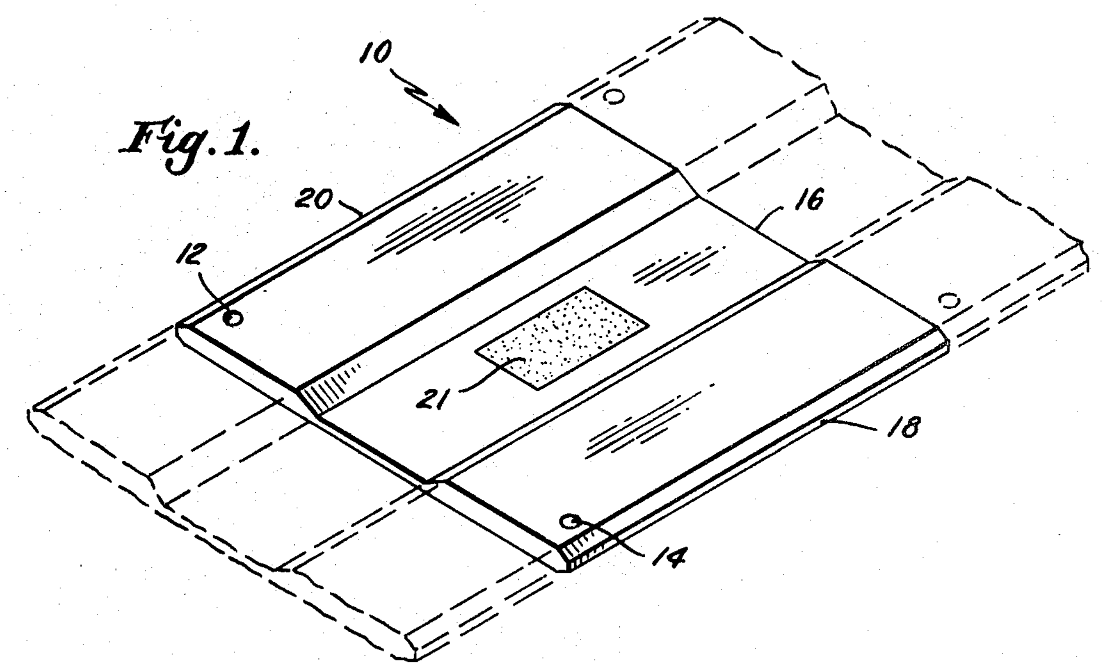
FIG. 1 is a perspective view of a unit of material from which a combined lead frame structure and connector pin structure may be formed.

Referring generally to the drawings, and particularly to FIG. 1, an endless strip 10 of a preselected conductive material is illustrated from which an integral package and connector unit in accordance with the present invention may be fabricated. The conductive member 10 is in the form of an elongated sheet or strip of material and may be provided with suitable indexing apertures 12, 14, etc. to aid in positioning. The strip 10 is shown subsequent to the completion of initial processing steps, which result in the transformation of a longitudinally extending central portion 16 into a member of a reduced thickness, as compared with the remainder of the strip. In addition, the outer longitudinal edges 18, 20 of the strip are deformed to define a generally bevelled shape. The central section 16 of reduced thickness facilitates the disposition of a semiconductor device on the unit, while the bevelled configuration aids in the subsequent insertion of the unit in an electronic system, as will be explained in detail hereinafter. The section of reduced thickness, as well as the bevelled portion may be formed by a suitable process. Typical examples of such processes include milling, skiving, form rolling, etc. In addition, an extremely thin coating 21 of a suitable nonreactive, conductive material, such as aluminum, which is compatible with semiconductor material, is provided on a generally central located portion of the section 16 in the area at which the semiconductor device is to be positioned and interconnected. The coating 21 may be in the form of a stripe applied on preselected areas of the section 16, and is preferably formed by electroplating techniques or utilizing conventional cladding techniques to form a metallurgical bond.

Figure 2:
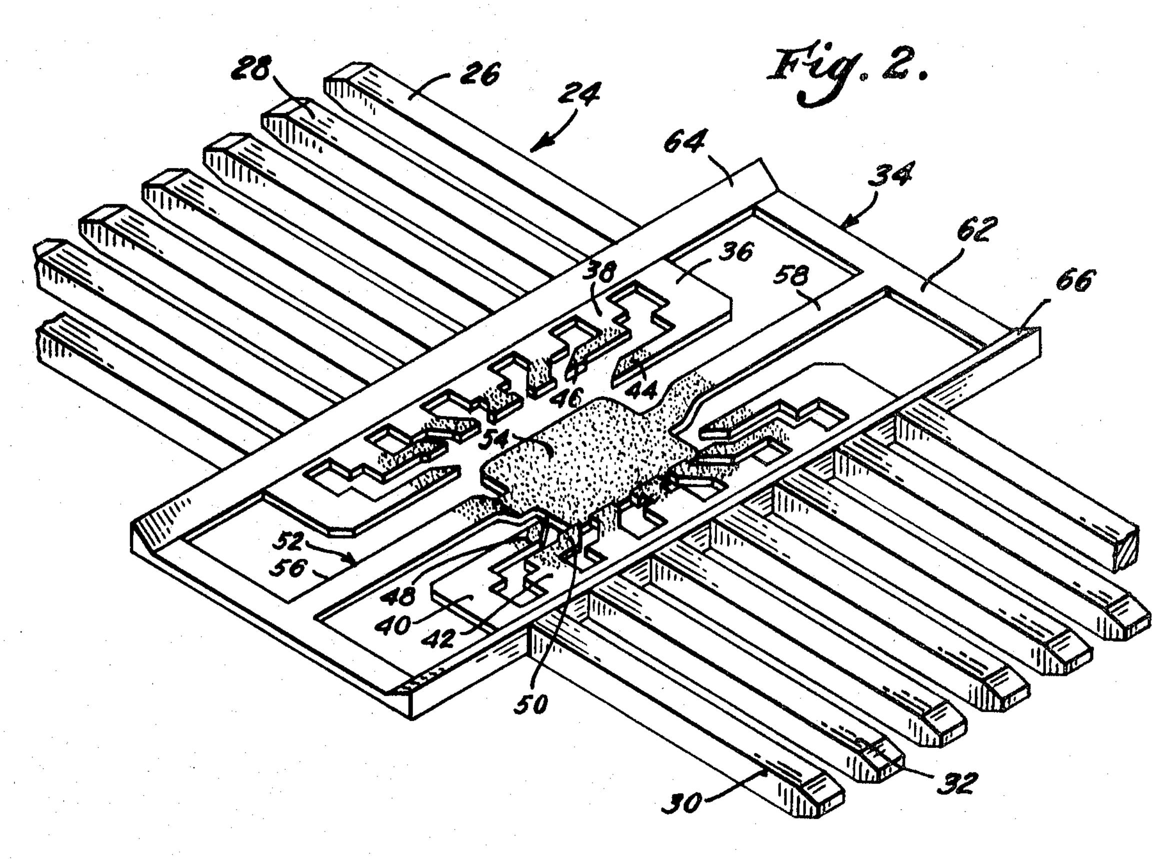
FIG. 2 is a partial perspective view of one embodiment of a combined lead frame structure and connector pin assembly at an intermediate stage of manufacture.

The reason for the provision of the reduced thickness central portion 16 and the thin electroplated coating 21 is more readily apparent from FIG. 2, which illustrates the strip 10 of FIG. 1 at a subsequent intermediate state of manufacture. As shown, a comblike structure 24 is formed including a plurality of male connector pins 26, 28, 30, 32, etc. The structure 24 may be formed by a suitable stamping operation applied to the relatively thick portions of the strip 10, extending from the opposed edges of the central portion 16. Each of these male connector pins terminates at its outer end in a bevelled end portion as a result of the initial formation of the bevelled edges 18 and 20. The bevelled edge portions serve to facilitate interconnection of the male connector pins 26, 28, 30, 32, etc. in a suitable electronic system such as a printed circuit board or the like and further facilitates the formation of subsequent wire wrap connections between the connector pins.

In certain instances, the stamping operation which forms the comblike structure 24 may be utilized for simultaneously forming a partial lead frame structure 34, from the central portion 16. However, is desired, separate stamping operations may be employed in order to form the comblike structure 24 and the partial lead frame structure 34.

In any event, regardless of the sequence of operations, in accordance with an important feature of the embodiments of the invention illustrated in FIGS. 2–8, the male connector pins 26, 28, 30, 32, etc., are formed integrally with the partial lead frame structure 34, which includes a plurality of lead members 36, 38, 40, 42, etc., each of which is joined at one end to an associated male connector pin and terminates at its opposite end in a terminal member 44, 46, 48, 50, etc. respectively. As illustrated, the terminal members extend inwardly toward each other and define a partially surrounded area adapted to receive a semiconductor device, as subsequently described in detail. It may be seen that the terminal members 44, 46, 48, 50 etc., and their associated respective lead members 36, 38, 40, 42, etc., are formed from the relatively thin material of the section 16 since these members are confined in an extremely small space and are adapted to be connected with a microminiaturized semiconductor device. In this connection, a bonding pad structure 52 is provided, including an enlarged central portion 54, located within the area defined by the terminal members, but spaced from the respective inner ends of the terminal members. Support ribs 56 and 58 extend from opposite ends of the enlarged central portion 54, and are temporarily interconnected with the frame 34 in order to provide increased mechanical rigidity for the structure.

The ribs ribs 56, 58 are secured to the structure 34, by the provision of temporary side interconnecting members 60 and 62, which in turn are connected between the opposite ends of longitudinally extending web members 64 and 66.

In the illustrated embodiment, the enlarged central portion 54 of the bonding pad 52 is arranged to accommodate a semiconductor device, such as an integrated circuit, having a plurality of circuit elements formed therein, so that electrical interconnections may be conveniently effected between the circuit elements of the integrated circuit and the various terminal members. In addition, the bonding pad serves an important function in aiding in the dissipation of heat from the semiconductor device, as well as providing mechanical support for the device. As shown in FIG. 2, the bonding pad is arranged in a plane, spaced slightly below the plane defined by the terminal members 44, 46, 58, 50, etc. Such an arrangement facilitates the accommodation of an integrated circuit which is generally in the form of a thin wafer of semiconductor material adapted to be supported on the bonding pad with its upper surface flush with the plane defined by the terminal members, thereby simplifying interconnections therewith.

The web members 64 and 66 also serve to provide an integral linkage between the comblike structure 24 comprising the male connector pins and the lead frame structure 34. In this connection, the web members provide a tapering junction between the male connector pins 26, 28, 30, 32, etc., and the plurality of lead members 36, 38, 40, 42, etc., and their associated terminals, 44, 46, 48, 50, etc. As previously explained, the lead members and their associated terminal members are formed from the thin central section 16 of the strip 10 since a relatively large number of closely spaced terminal members are arranged in a highly confined space to facilitate the provision of interconnection with the microminiaturized semiconductor device. In addition, the provision of a relatively thin workpiece facilitates the stamping operation utilized in forming the terminal members. The male connector pins 26, 28, 30, 32, etc., however, are not as closely spaced and preferably have substantial mechanical strength and rigidity since they are to be subsequently connected in an electronic system and may be subjected to mechanical stress. Accordingly, the elements are arranged having the differing thicknesses described with the integral junction between the connector pins and the lead members provided by the longitudinally extending web members 64 and 66, each of which is of a tapering thickness. More particularly, the web members are arranged to taper transversely in thickness between the thickness of the lead members at one edge and the thickness of the male connector pins at an opposite edge, as may be seen from FIG. 2. Further, the edge portions of the web members at the junctions with the lead members serve an additional function, since a bend is to be made along these thinner edges of the web members between the connector pins and the lead members, as will be subsequently explained in detail. The provision of the relatively thin edge portions of the web members facilitates the provision of such a bend, while the thicker edge joined to the male connector pins aids in maintaining the mechanical rigidity of the device.

Figure 3:
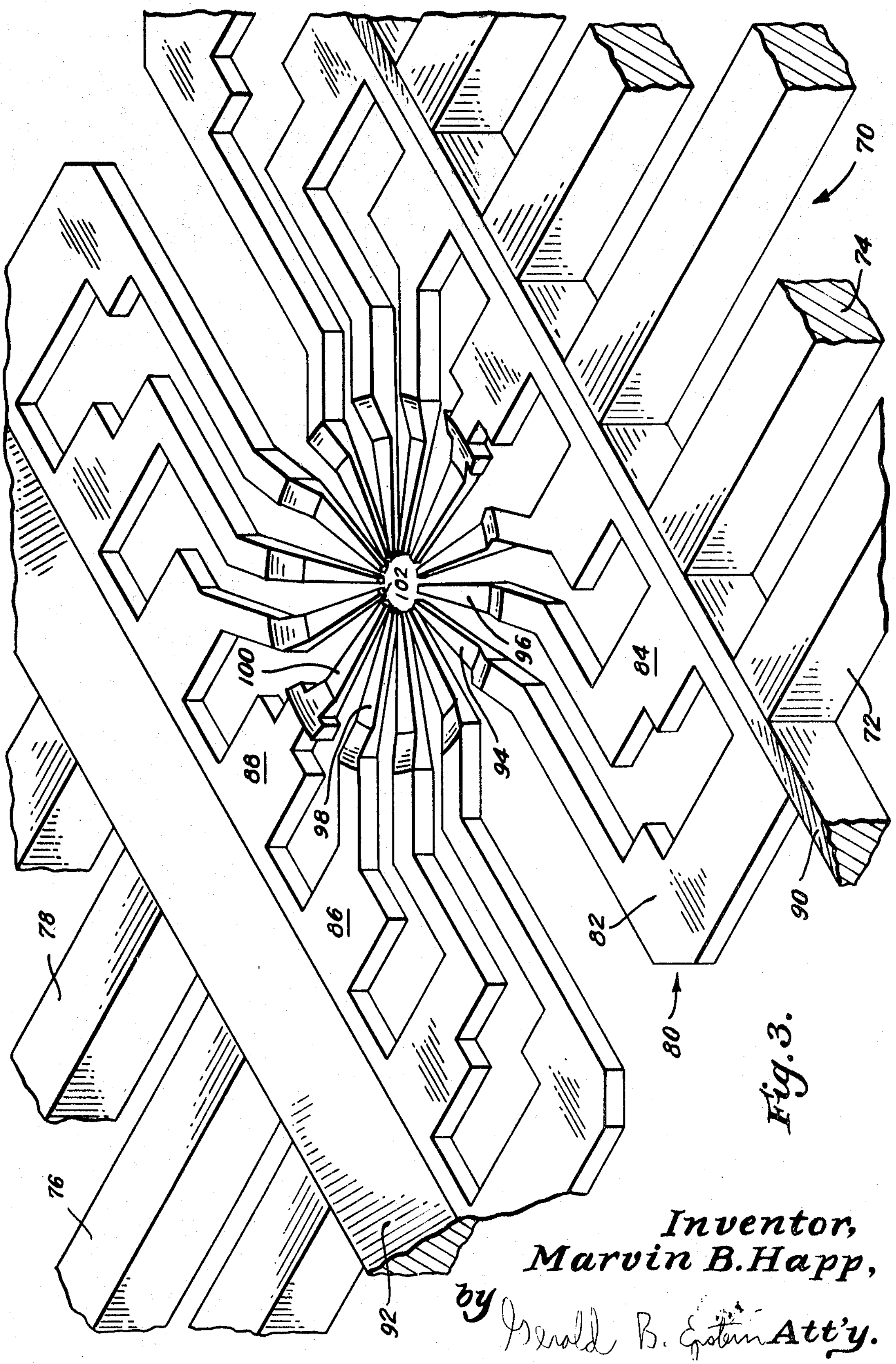
FIG. 3 is a partial perspective view of another embodiment of a combined lead frame structure and connector pin assembly at an intermediate stage of manufacture.

Referring to FIG. 3, an alternative embodiment of a structure at the same stage of fabrication as the structure illustrated in FIG. 2 is shown, greatly enlarged. This structure is also formed from a sheet or strip, such as that illustrated in FIG. 1, but a different configuration of lead members and associated terminal members is formed integrally joined to male connector pins similar to those of FIG. 2. More particularly, a comblike structure 70 similar to the structure 24 is formed, including a plurality of male connector pins 72, 74, 76, 78, etc., extending from opposite sides of the structure, and a partial lead frame structure 80 is formed from the relatively thin central section 16 of the strip 10. In this connection, the partial lead frame structure 80 includes a plurality of lead members 82, 84, 86, 88 etc., each of which is integrally connected with one of the male connector pins 72, 74, 76, 78, etc. Once again, only several of the lead members and several of the integrally joined associated male connector pins are designated by reference numerals in view of the similarity between individual male connector pins and lead members. Also, the structure illustrated in FIG. 3 is only a partial view in order to more clearly illustrate various features of the invention in an enlarged size. Each of the lead members 82, 84, 86, 88, etc., may be formed by a stamping operation, or the like, applied to the thin central section of a strip of material, such as that illustrated in FIG. 1, while the male connector pins 72, 74, 76, and 78 may be formed by a similar stamping operation applied to the relatively thicker side portions of the strip. In addition, similarly to the FIG. 2 embodiment, a pair of longitudinally extending web members 90 and 92 remain integrally connecting the respective male connector pins of the structure 70 with the associated lead members extending from opposite sides of the partial lead frame structure 80. The web members 90 and 92 are substantially similar to the web members 64 and 66 of the FIG. 2 embodiment, and each is of a transversely tapering thickness with the thinner edge integrally connected to the lead members and the thicker edge integrally connected with the associated male connector pins.

In the embodiment illustrated in FIG. 3, a separate bonding pad is not provided. Instead, the structure is arranged to directly support a semiconductor device, such as an integrated circuit. More particularly, each of the lead members 82, 84, 86, 88, etc., extends from one of the web members and terminates in an associated terminal member 94, 96, 98, 100, etc., respectively. In the illustrated embodiment, the lead members are arranged as shown to define a radial pattern in which the terminal members extend toward a common center, but terminate short of intersection at the common center in order to define a relatively minute circular central space 102. The space 102 primarily functions to assure proper positioning of the semiconductor device, which is to be subsequently supported by and electrically connected with the respective terminal members and hence, electrically connected with the associated male connector pins. In addition, it may be noted from FIG. 3 that the terminal members 94, 96, 98, 100, etc., are all of a somewhat reduced thickness as compared with their associated lead members which serves to facilitate subsequent accommodation of a semiconductor device directly on the radially arranged terminal members. More particularly, the reduction in thickness is approximately equal to the height or thickness of the semiconductor device, which generally is in the form of a thin wafer of semiconductor material of a size arranged to fit conveniently within the space defined by the terminal members. Consequently, in the illustrated embodiment, the exposed surface of the semiconductor device is substantially flush with the main body of the respective lead members.

As previously explained, the web members 90, 92 (FIG. 3) and the web members 64, 66 (FIG. 2) are of a transversely tapering thickness including relatively thin portions integrally connected with the lead members and relatively thick portions integrally connected with the associated connector pins. The thin portions not only serve to provide a smooth transition between the web members and the associated lead members, but also serves an additional function. More particularly, the thin portions of the respective web members serve to define bend areas at which a bend of a desired angle may be conveniently effected without disrupting the physical continuity of the structure. Preferably, approximately a right-angle bend is effected such that the respective male connector pins of the structure extend generally perpendicular to their associated lead members with the male connector pins each extending in the same direction in generally parallel, spaced relationship. The structures formed subsequent to such a bending operation applied to the embodiments illustrated in FIGS. 2 and 3, are respectively shown in FIGS. 4 and 5, which particularly illustrate the generally L-shaped junction formed between the lead members and the male connector pins.

In a preferred embodiment of the present invention, the strip 10 is processed such that the centrally extending portion 16 is approximately the thickness of a conventional integrated circuit lead frame, i.e., 0.010 inch while the remaining thicker portion is approximately of the thickness of a conventional connector unit employed for connecting integrated circuit packages to a printed circuit board or the like. Thus, in preferred embodiments of the devices shown in FIGS. 2 and 3, the terminal members and lead members may be arranged to have a thickness of approximately 0.010 inch while the male connector members may be arranged to have a thickness of approximately 0.025 inch, thereby insuring compatibility with existing equipment.

Figures 4, 5:
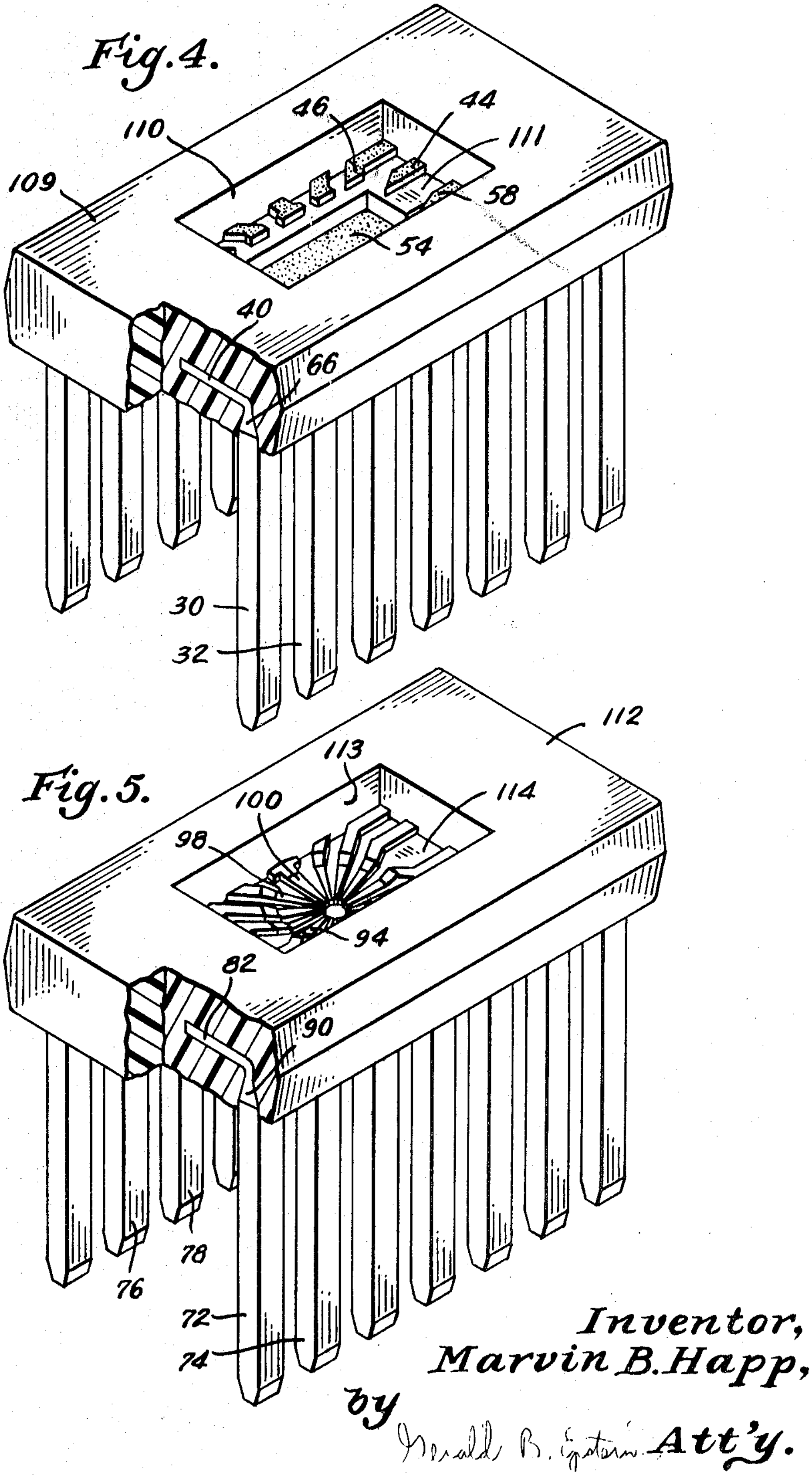
FIG. 4 is a perspective view partially broken away for purposes of illustration of the lead frame structure and connector pin assembly illustrated in FIG. 2 prior to the connection of an electronic device to the unit.
FIG. 5 is a perspective view partially broken away for purposes of illustration of the lead frame structure and connector pin assembly illustrated in FIG. 3 prior to the connection of an electronic device to the unit.

Referring in detail to FIG. 4, which illustrates a subsequent step in the processing of the embodiment illustrated in FIG. 2, the relatively thin portions of the web members 64, 66 have been bent to define a substantially right angle or L-shaped junction between the partial lead frame structure, i.e., the plurality of lead members and their associated terminals, and the plurality of male connector pins. More particularly, FIG. 4 is partially broken away in order to illustrate the web member 66 subsequent to the application of the bending operation. The bend is effected along the thin edge of the web member to form a longitudinally extending L-shaped junction between the lead members and male connector pins. Although the bend along the thinner edge of web member 64 is not shown in detail in FIG. 4, a similar L-shaped junction is formed. In addition, an operation is performed to remove the connecting material along the respective web members 64 and 66 between adjacent associated male connector pins and lead members in order to avoid short circuiting adjacent members. This operation may be effected by disposing the unit in a suitable jig and subjecting it to a cutting procedure, or the like. The resultant structure in which the individual adjacent members are separated may be clearly seen in the partially cutaway illustration of FIG. 6.

In order to provide a semicompleted package suitable for sale to an ultimate user, desiring to arrange an electronic device of his own choice in the unit or, alternatively, to prepare the unit for receipt of an electronic device as the next stage of fabrication an encapsulation procedure is effected. In this connection, an encapsulation material 109 is provided, as shown, having a cavity 110 exposing the various terminal members and the bonding pad 54, thereby providing a package suitable for use in mechanically supporting a semiconductor device such as an integrated circuit on the bonding pad, while electrical connections may be effected with the terminal members. The encapsulation material substantially completely surrounds the various lead members of the partial lead frame structure 34, as well as the web members 64, 66 and a predetermined portion of each of the associated male connector pins, while exposing the terminal members and the bonding pad through the cavity 110. It may be noted that the relatively thin lead members, the bend portions, and the portions of the male connector pins connected to the relatively thick edges of the web members 64, 66 are substantially completely enclosed in the encapsulation material in the illustrated embodiment. Thus, all portions of the unit formed of the relatively thinner material are enclosed within the encapsulation in order to impart increased structural strength and rigidity to the structure, while only a portion of the male connector pins are exposed. In addition, the encapsulation 109 is arranged such that a first support level 111 is provided directly under and in supporting relationship with the plurality of terminal members, which thus rest upon the level 111 of encapsulation material and are supported. Further, the bonding pad 54 is also supported on a lower floor (not shown in FIG. 4) of the encapsulation material in the cavity 110 to receive additional mechanical support. As shown, the male connector pins extend from the surface of the encapsulation material opposite to that at which the cavity 110 is provided. Such a configuration is highly advantageous in avoiding interference with the disposition and processing of a device within the cavity. The male connector pins extend from the encapsulation material in a pair of parallel aligned rows, the spacing being generally equivalent to that employed in conventional connector structures utilized in conjunction with standard dual-in-line packages, and are suitable for being received in appropriate openings in a printed circuit board or the like, and in certain instances, may extend through such openings and may be interconnected as desired using conventional wire wrap techniques. The encapsulation material 109 may be formed in the shape shown by suitable cast molding, transfer molding, or other such conventional techniques and may be fabricated of a suitable thermosetting epoxy, or other such potting compound. Preferably, the L-shaped junction between the lead members and the connector pins is formed by effecting the bending operation as well as the removal of the material between adjacent members prior to the molding operation, although in certain instances, these operations may be effected as part of the molding operation.

Referring to FIG. 5, a structure similar to that illustrated in FIG. 4 is shown. However, the FIG. 4 embodiment illustrates the structure shown in FIG. 3 subsequent to being processed similarly to the FIG. 4 embodiment. In this connection, a generally L-shaped or right-angle bend is effected along the relatively thin edge portions of each of the web members 90 and 92 (the portion 90 being exposed by the partial cutaway view in FIG. 5) such that the respective connector pins extend generally perpendicularly to their associated lead members. For example, the lead member 82 and its associated connector pin 72 are shown in detail extending at right angles to each other as a result of the generally L-shaped junction formed by bending the web member 90 along its relatively thinner edge portion to form approximately a right-angle bend. As a result of the bending operation, the male connector pins are arranged in a pair of aligned parallel rows, the spacing between pins being generally equivalent to that employed in conventional connector structures utilized in conjunction with standard dual-in-line packages, and are adapted for insertion in suitable openings in a printed circuit board or the like, similar to the FIG. 4 embodiment. As shown, suitable encapsulation material 112 similar to the encapsulation material 109 is arranged to encapsulate the unit similar to the FIG. 4 embodiment. The encapsulation may be effected by casting, transfer molding, etc., in a conventional manner, with the material 112 being arranged to include a cavity 113 exposing all of the radially arranged terminal members 94, 96, 98, 100, etc. The cavity 113 is similar to cavity 110 so as to achieve uniformity and convenient interchangeability between the various units. The encapsulation material 112 is arranged to partially surround the lead member portions of the partial lead frame structure and a preselected portion of all the male connector pins as well as the web members 90, 92, which integrally connect the various lead members and their associated male connector pins. Of course, the portions of the web members 90, 92, which interconnect adjacent lead members and adjacent male connector pins is removed by suitable stamping, cutting or other such operations prior to the encapsulation step, as previously explained in connection with FIG. 4. In addition, the male connector pins preferably extend from a surface of the encapsulation material opposite to the surface at which the cavity 113 is provided so as to avoid interference with the positioning of the semiconductor device.

The encapsulation material 112 is arranged such that a first support level or floor 114 is provided in supporting relationship with the lead members, which are preferably at least partially embedded within the floor 114 and are supported thereby. Further, the terminal members, which in the illustrated embodiment extend along the floor 114, are additionally supported by the encapsulation, and are preferably, partially embedded within the encapsulation material, since it is important to preclude movement of the terminal members in order to assure accurate positioning during the subsequent attachment of a semiconductor device, and in order to impart additional structural strength to the unit. In this connection, a semiconductor device may be positioned directly on the terminal members with its upper exposed surface generally flush with the lead members resting on the floor 114, as explained hereinafter.

Figure 6:
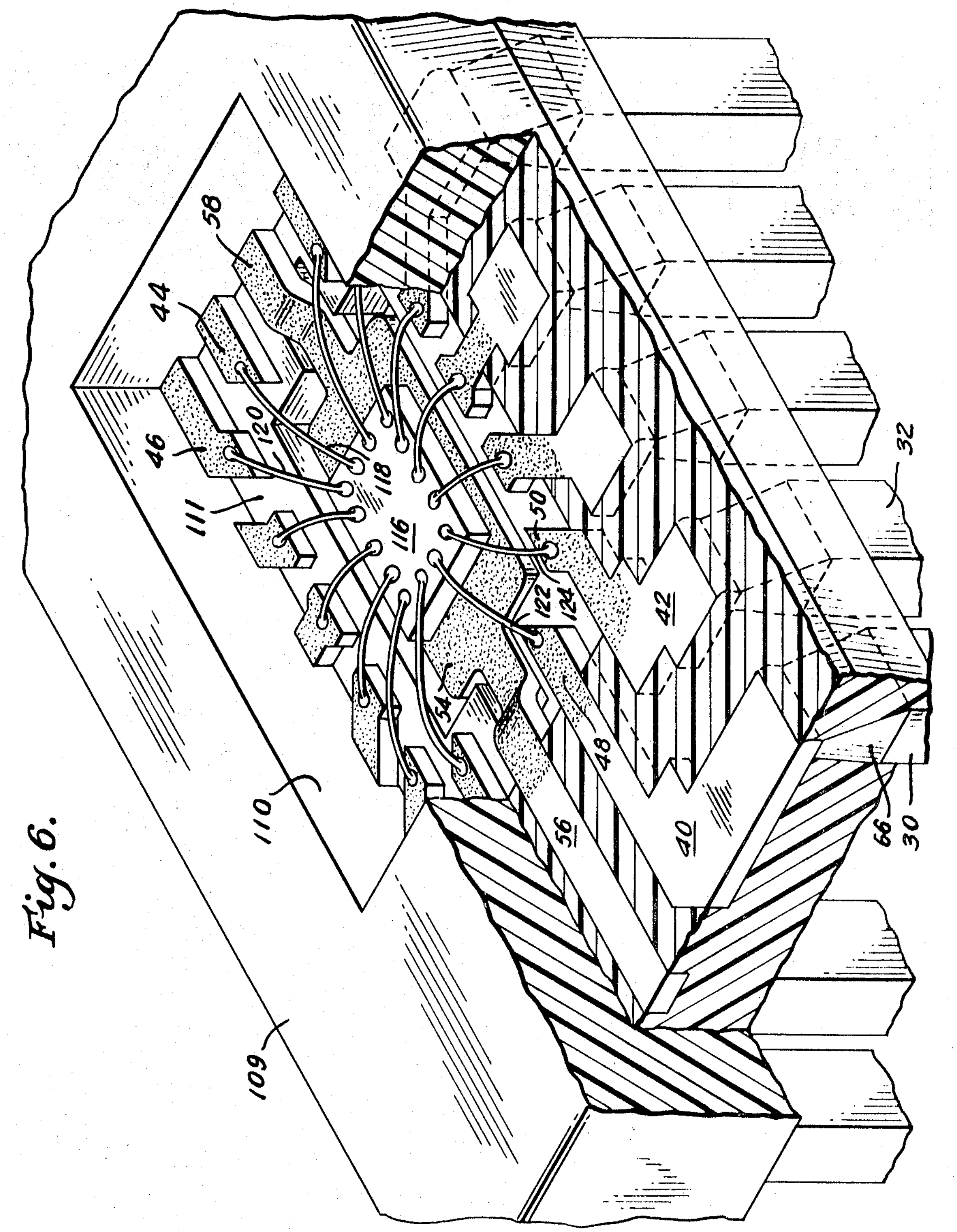
FIG. 6 is a partial perspective view partially broken away for purposes of illustration of the device shown in FIG. 4 with a semiconductor device disposed in position and electrical connections formed between the semiconductor device and the connector pin assembly.

Referring now to FIG. 6, an enlarged, partially broken away view of the embodiment of FIG. 4 is shown with semiconductor device 116 preferably comprising an integrated circuit, secured in position on the bonding pad 54. More particularly, the integrated circuit 116 is secured to the surface of the bonding pad 54 utilizing a suitable conductive cement or the like, so as to maintain the device firmly in position while enhancing the heat dissipation properties of the unit. As shown, the various terminal members are arranged in a generally coplanar configuration, and a plurality of whisker wire leads 118, 120, 122, 124, etc., are provided preferably ultrasonically bonded to various regions of the exposed surface of the integrated circuit 116 to effect connections between circuit elements, formed at these locations in the integrated circuit 116, and various of the coplanar terminal members and hence to their associated male connector pins. For example, it may be seen that the gold wire lead 122 connects a preselected area of the integrated circuit 116 to the lead member 40 through its associated terminal member 48 and thus to the male connector pin 30. Similarly, the gold wire lead 124 connects another preselected area of the integrated circuit 116 to the lead member 42, through its associated terminal member, 50, and hence, to its associated male connector pin 32. In this manner, the plurality of gold whisker wire leads are arranged to connect various circuit elements of the integrated circuit to the various terminal members and lead members and, thus, to their associated male connector pins, which in turn are interconnected, connected to other similar systems, etc., utilizing suitable techniques such as wire wrapping. In addition, it may be noted that since the partial lead frame structure is formed in part from the area 21 (FIG. 1), plated with conductive material, the terminal members, as well as the bonding pad are illustrated as stipled to indicate the presence of the conductive coating which improves the various electrical connections.

The manner in which the various terminal members are supported on the floor 111 exposed by the cavity 110 is also illustrated in detail in FIG. 6. Similarly, the semiconductor bonding pad is supported at a level somewhat below the floor 111 such that the exposed surface of the integrated circuit to which the connections are made extends slightly above the floor 111 and is substantially flush with the plane defined by the coplanar terminal members. Consequently, the whisker wire leads are bonded between points at the same level which facilitates the bonding procedure. Also, it may be seen that the supporting ribs 56 and 58 extending from the semiconductor bonding pad 54 are supported on the surface of the floor 111 and are thus coplanar with the terminal members and further extend into the encapsulation material 109 beyond the confines of the cavity 110 to receive additional structural support.

Figures 7, 8:
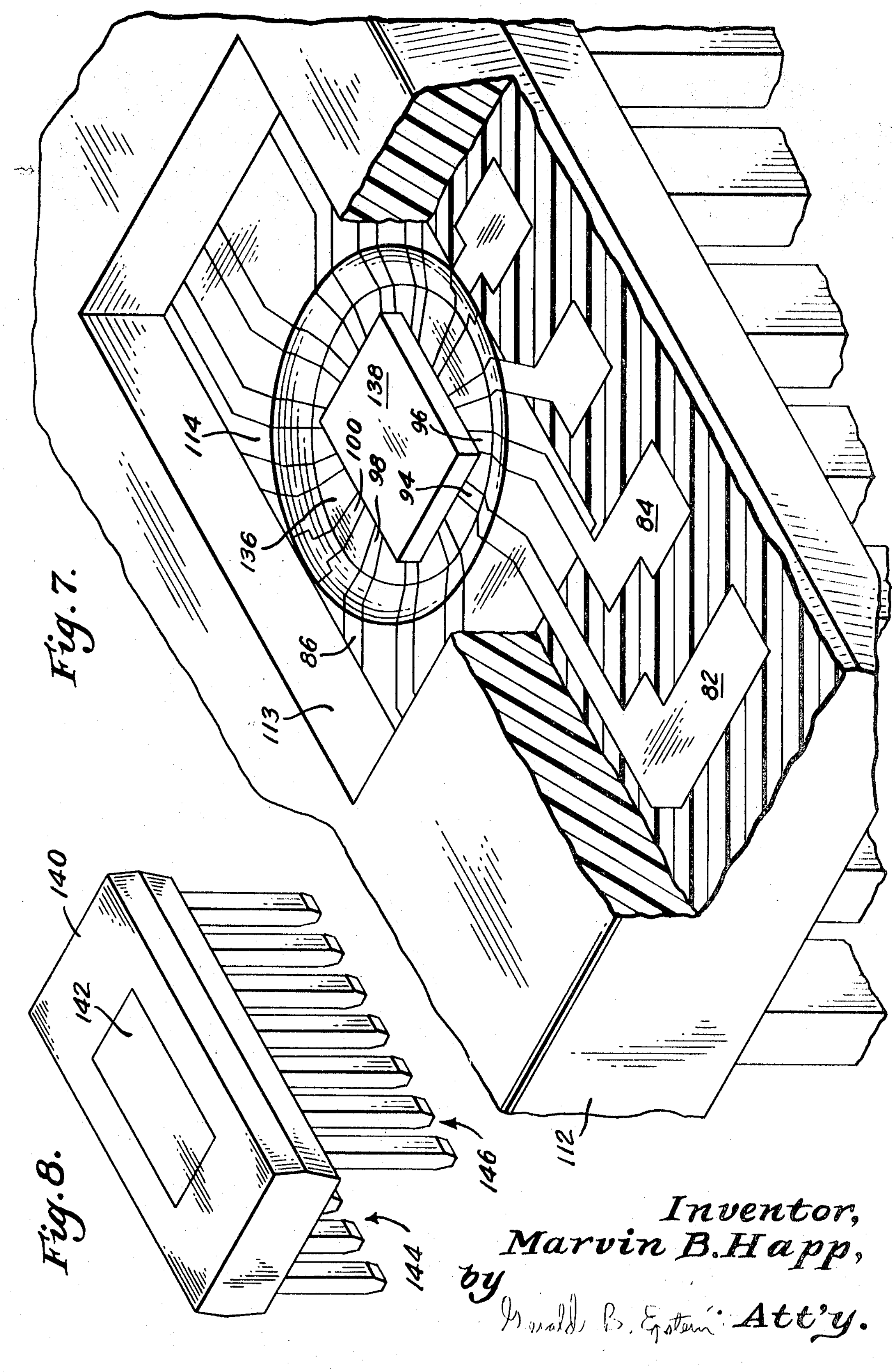
FIG. 7 is a partial perspective view partially broken away for purposes of illustration showing the device of FIG. 5 with a semiconductor unit disposed in position with electrical connections formed between the connector pin assembly and the semiconductor device.
FIG. 8 is a perspective view of a completed integral package and connector unit with an electronic device enclosed and a sealant plug in position.

Referring to FIG. 7, the embodiment of the invention illustrated in FIG. 5 is shown partially cutaway at the next subsequent stage of processing similar to the FIG. 6 embodiment. The various radially extending terminal members 94, 96, 98, 100, etc., are generally coplanar, and are supported at least partially embedded within a floor 136 provided by the encapsulation material 112. The floor 136 is at the base of the cavity and in the illustrated embodiment is at a level slightly below the floor 114 on which the lead members are supported, although the floors 136 and 114 may be coplanar is desired. As a result of arranging the terminal members at a somewhat lower level, it is convenient to position a semiconductor device 138, such as an integrated circuit, directly on the coplanar terminal members and in electrical contact therewith with the depression defined by the lower floor 136. Consequently, the exposed surface of the integrated circuit 138 is approximately flush with the floor 114 in order to provide a compact structure which may be readily sealed against the environment, as will be explained hereinafter. Further, such an arrangement minimizes the existence of irregular surfaces within the structure which improves the mechanical rigidity of the unit.

The integrated circuit 138 is arranged to be mounted face down in direct electrical contact with the terminal members. In this regard, a variety of circuit elements are arranged to terminate at a face of the wafer from which the device 138 is formed and this face is then bonded directly to the terminal members such that the terminal members 94, 96, 98, 100, etc., are in direct electrical contact with preselected regions, at the face at which the various circuit elements of the device 138 terminate. The terminal members provide mechanical support for the integrated circuit, as well as providing electrical connection between the circuit elements and the male connector pins through the various associated lead members. The integrated circuit 138 is preferably mounted in the position illustrated utilizing an ultrasonic bonding technique.

Although not shown in the drawings, if desired, an integrated circuit having a plurality of beam leads may be packaged in a unit such as that described above. For example, the integrated circuit may be suitable positioned within the cavity and the beam leads may be electrically connected to selected terminal members utilizing ultrasonic bonding techniques to provide a unit such as that illustrated in FIG. 7.

In order to complete the fabrication of a device such as that shown in FIGS. 6 and 7, it is generally desirable to arrange to appropriately seal the cavity provided in the encapsulation material subsequent to the disposition and connection of the respective semiconductor device. Accordingly, FIG. 8 illustrates a device such as that shown in either FIGS. 6 or 7 in which a suitable encapsulation material 140, such as that previously described, is provided, and in which a suitable sealant means 142 is sealingly disposed in the cavity in the encapsulation material. The sealant means 142 serves to protect the often sensitive integrated semiconductor device against contamination from the exterior environment, and also serves to add further mechanical strength and rigidity to the overall structure and particularly to the interconnections between the semiconductor device and the lead members. Preferably, the sealant mean comprises a plug of encapsulation material similar to the encapsulation material 140, such as a suitable thermosetting epoxy, which is thermally and chemically compatible with the material 140 and with the semiconductor devices 116, 138. The sealant plug 142 may be applied utilizing conventional cast molding or transfer molding techniques, or may be preformed and merely inserted in position. The disposition of the sealant plug generally completes the processing of the structure in accordance with the principles of the present invention, except for subsequent testing procedures and connection in a suitable electronic system, subsystem, etc.

As shown in FIG. 8, the completed unit includes a pair of parallel aligned rows of male connector pins extending from a surface of the encapsulation material 140 and is suitable for insertion in an appropriate electronic system, such as a printed circuit board or the like.

Figures 9, 10:
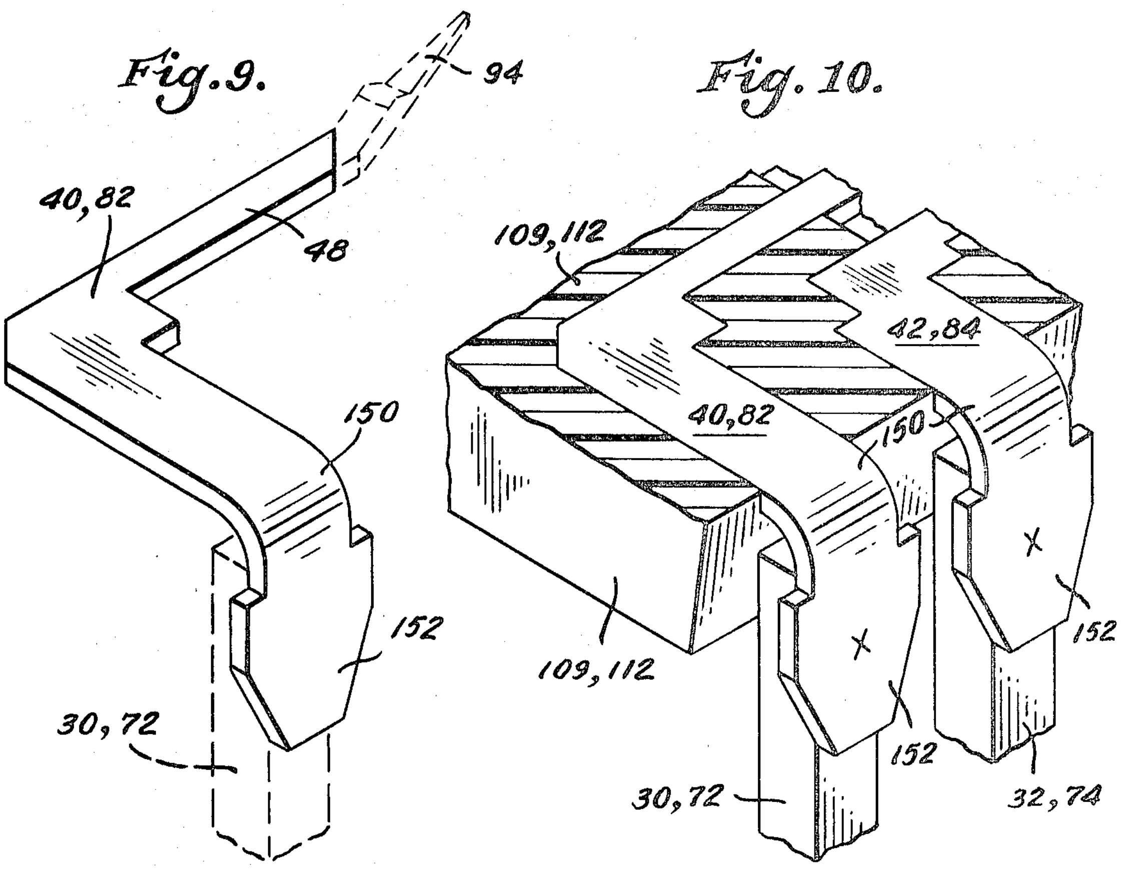
FIG. 9 is a partial perspective view partially broken away for purposes of illustration of an alternative embodiment of the present invention.
FIG. 10 is a perspective view partially broken away for purposes of illustration of the embodiment illustrated in FIG. 9 at a subsequent stage of fabrication.
Figure 11:
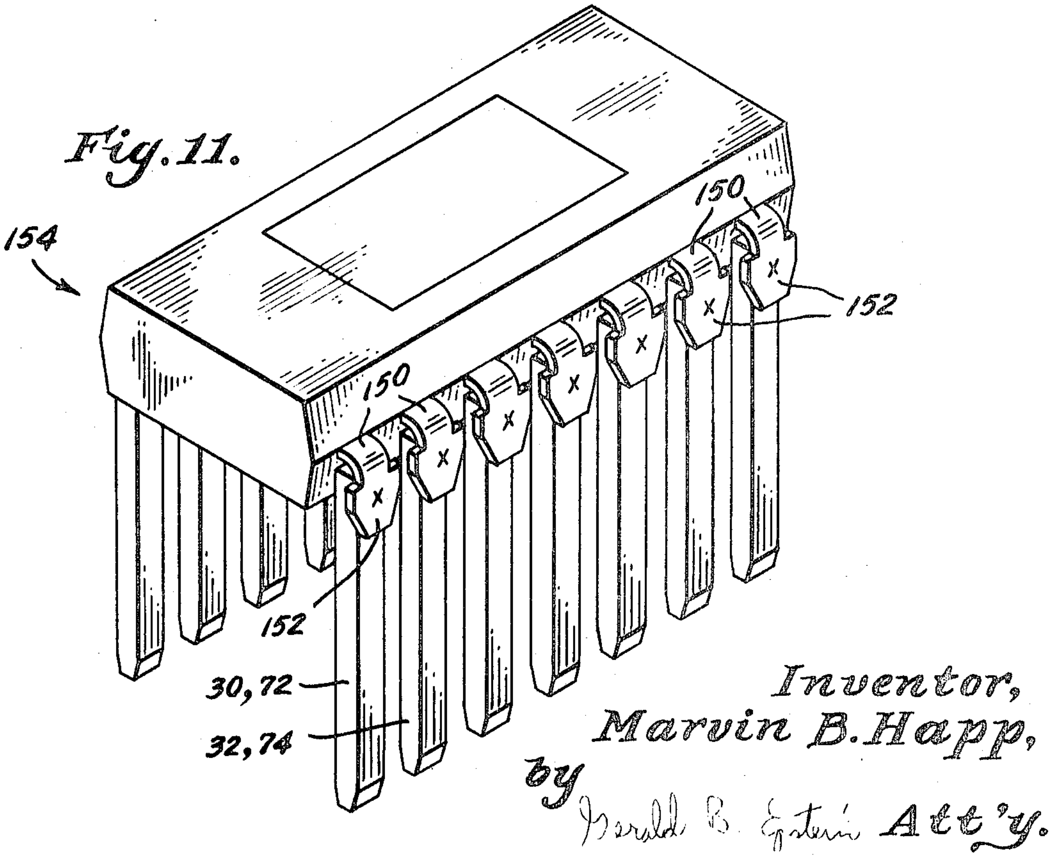
FIG. 11 is a perspective view of a completed unit shown in FIG. 9 and 10 encased in an encapsulation material.

Referring now to FIGS. 9–11, an alternative embodiment of the present invention is illustrated in which a partial lead frame structure such as that shown in FIGS. 2 or 3 is provided in a somewhat modified form, terminating in an L-shaped bend exteriorly of the supporting encapsulation material, and is secured to a plurality of male connector pins, which are joined thereto, exteriorly of the encapsulation material. More particularly, in FIG. 9 a lead member 40, 82 is shown terminating at its inwardly extending end in a terminal member 48, 94, which is adapted to be connected to a semiconductor device, while terminating at its opposite end in a shoulder 150 having an integrally connected flange 152, which forms a generally arcuate bend with the shoulder and depends essentially perpendicularly therefrom. The flange 152 is adapted to be secured to one of the male connector pins 30, 72 and may be attached to the pin by welding, brazing, etc., although preferably a spot welding technique is utilized. The male connector pin may be attached to the exterior of the flange 152 if desired, but preferably the flange is spaced from the outer edge surface of the encapsulation material 109, 112, a sufficient distance to accommodate the male connector pin 30, 72, intermediate the edge of the encapsulation material and the inwardly facing surface of the flange, as shown in FIG. 10. The male connector pin 30, 72 may be thus conveniently secured to the inwardly facing surface of the flange 152, such as by spot welding and preferably abuts the edge of the encapsulation material so as to be maintained rigidly in position.

The particular configuration illustrated in FIGS. 9–11 is applicable for use in connection with the terminal member arrangement described in connection with FIGS. 2 or 3, since the requisite modification merely entails arranging the lead member to terminate in the shoulder 150 which is integrally connected to the depending flange 152, rather than arranging the respective lead members to extend into integrally connected male connector pins. A significant advantage which resides in the utilization of the embodiment illustrated in FIGS. 9–11 is that the male connector pins may be fabricated entirely separately from the remainder of the unit such as by cutting the requisite lengths from a roll of suitable wire. The male connector pins may thus be welded into position as a final step in the manufacturing operation in order to form a completed unit 154 as illustrated in FIG. 11, the unit in FIG. 11 being generally similar to that shown in FIG. 8. In addition, as a result of providing a device such as illustrated in FIGS. 9–11, a substantial increase in manufacturing efficiency may be achieved in certain instances since the molding operation for forming the encapsulating material may be considerably simplified. In this connection, the terminal member, the lead member, the shoulder portion, and the associated depending flange may comprise an integral unit, thereby obviating the need for a bending operation to form the previously described L-shaped junction between the lead member and its associated connector pin. Furthermore, the benefit of substantially increased reliability in comparison with prior art units requiring separate lead frame and connector structures, is present in the alternative embodiment of FIG. 11, as well as in the FIG. 8 embodiment.

Thus, a number of structures have been described and shown which eliminate the necessity for the additional connections ordinarily required, when a semiconductor device package is connected to a connector for subsequent interconnection in an electronic system, and which results in increased reliability of the unit, and the interconnection system, in view of the simplified processing procedures, and improved structural strength.

Various changes and modifications will be readily apparent to one skilled in the art and any of such changes and modifications are deemed to be within the spirit and scope of the present invention.

What is claimed is:

1. A composite electronic device package and connector unit comprising a conductive member including a plurality of lead members extending from opposite directions and having mutually spaced terminal members at one end adapted to be connected to an electronic device and a plurality of associated male connector pins rigidly joined to respective ends of said lead members opposite to said terminal members, said male connector pins having a substantially greater thickness than said lead members, web members integrally connecting said respective ends of said lead members to said male connector pins, said web members having a varying thickness tapering from said lead members to the substantially greater thickness of said male connector pins means for supporting the electronic device in electrical communication with said terminal members, and a preselected nonconductive encapsulation material encapsulating said plurality of lead members, said web members and a preselected portion of said male connector pins to expose the end portions thereof extending away from said web members, said encapsulation material including a cavity exposing said terminal members to permit electrical connections to be made between said terminal members and the electronic device.

2. A composite electronic device package in accordance with claim 1 wherein said male connector pins extend outwardly away from said encapsulation material and generally perpendicular to said lead members.

3. A composite electronic device package in accordance with claim 2 wherein said plurality of lead members are coplanar and extent into said encapsulation material from mutually opposite directions, said web members each have a generally right-angle bend therein, and said male connector pins extend from the encapsulation material in a direction normal to the plane defined by said lead members.

4. A composite electronic device package and connector in accordance with claim 3 wherein said terminal members are coplanar and terminate in spaced relationship to define a partially enclosed space adapted to accommodate the electronic device, said space being exposed by said cavity, and said male connector pins depend from the relatively thickest portions of said web members adjacent opposed peripheral portions of said cavity and extend from said encapsulation material in aligned spaced relationship with respect to each other.

5. A composite electronic device package and connector in accordance with claim 4 wherein the electronic device comprises a semiconductor device having a plurality of circuit elements at a surface thereof, said semiconductor device being supported within said space in said cavity, mans electrically connecting said terminal members with selected circuit elements, and a closure means is sealingly disposed within said cavity.

6. A composite electronic device package and connector in accordance with claim 4 wherein a bonding pad is provided including an enlarged central portion arranged in spaced relationship from said terminal members in said partially enclosed space, said bonding pad including a pair of support members extending from said enlarged central portion and terminating within said encapsulation material to rigidly support said bonding pad, said support members being coplanar with said terminal members and said lead members, each support member including a bend at an angle to the plane defined by said coplanar terminal members to effect positioning of said enlarged central portion at the base of said cavity spaced from said coplanar terminal members.

7. A composite electronic device package and connector in accordance with claim 6 wherein the electronic device comprises a semiconductor device supported on said enlarged central portion of said bonding pad and having an exposed surface substantially flush with the plane defined by said terminal members, said exposed surface including a plurality of circuit elements, electrical conductors interconnecting said terminal members and selected circuit elements, and a plug of encapsulation material sealingly disposed within said cavity for protecting and maintaining said semiconductor device and said conductors rigidly in position.

8. A composite electronic device package and connector in accordance with claim 3 wherein said terminal members are arranged in a generally radial configuration to define a space within said cavity, said space being substantially completely surrounded by said terminal members.

9. A composite electronic device package and connector in accordance with claim 8 wherein the electronic device comprises a semiconductor device having a plurality of circuit elements at a surface thereof, said semiconductor device being disposed in registration with said space and being supported at said surface by said radially arranged terminal members in electrical contact with selected circuit elements.

10. A composite electronic device package and connector in accordance with claim 9 wherein said terminal members are supported by said encapsulation material at the base of said cavity and a plug of encapsulation material is sealingly disposed within said cavity.

11. An integral package and connector unit for electronic devices comprising a plurality of spaced lead members of a first preselected thickness having inner ends defining a plurality of coplanar terminal members adapted to be connected to an electronic device and having outer ends terminating in aligned spaced relationship, a plurality of male connector pins of a second preselected thickness greater than said first preselected thickness integrally connected to said outer ends of said lead members forming L-shaped junctions therewith, said male connector pins extending generally perpendicularly form said outer ends and terminating in aligned parallel relationship and being adapted for connection in an electronic system, a nonconductive encapsulation material encapsulating said lead members said L-shaped junctions and preselected portions of said male connector pins and means defining a selectively sealable cavity in said encapsulation material exposing said coplanar terminal members.

12. An integral package and connector unit in accordance with claim 11 wherein said L-shaped junctions vary transversely in thickness between said first preselected thickness at said outer ends of said lead members and said second preselected thickness at said male connectors.

13. An integral package and connector unit in accordance with claim 12 wherein said L-shaped junctions include edge portions of said first preselected thickness defined at the associated outer ends of said lead members.

14. An integral package and connector unit in accordance with claim 12 wherein a semiconductor device is supported within said cavity in electrical communication with said terminal members and a closure means formed of said encapsulation material is sealingly disposed within said cavity.

15. An integral package and connector unit in accordance with claim 12 wherein said lead members and said male connector pins are formed of a unitary body of conductive material.

16. An integral package and connector unit in accordance with claim 15 wherein said lead members have a thickness of approximately 0.010 inch and said male connector pins have a thickness of approximately 0.025 inch.

17. A unitary package and connector unit for an electronic device comprising a first row of spaced lead members extending from a predetermined direction having inner ends defining a plurality of terminal members and having outer ends terminating in aligned spaced relationship, a second row of spaced lead members extending from an opposite direction from said first row, having inner ends defining terminal members cooperating with said plurality of terminal members to define an array of coplanar terminal members adapted for connection to an electronic device, and having outer ends terminating in aligned spaced relationship, said first and second rows of lead members being of a first preselected thickness, a plurality of male connectors of a second preselected thickness greater than said first preselected thickness integrally joined to said outer ends of said first and second rows of lead members by integral L-shaped junctions, said male connectors defining first and second rows depending generally perpendicularly from said first and second rows of lead members respectively in aligned parallel relationship and being adapted for connection to an electronic system, and a nonconductive encapsulation material encapsulating said lead members said junctions and a preselected portion of said male connectors said encapsulation material having a selectively closable cavity exposing said array of coplanar terminal members.

18. A unitary package and connector unit in accordance with claim 17 wherein a bonding pad for mechanically supporting the electronic device is supported within said cavity by said encapsulation material in a position generally centrally located with respect to said array of terminal members and spaced from said terminal members.

19. A unitary package and connector unit in accordance with claim 18 wherein the electronic device comprises a semiconductor device supported by said bonding pad, means electrically connecting preselected areas of said semiconductor device with said array of terminal members exposed by said cavity, and means for sealingly closing said cavity.

20. A unitary package and connector unit in accordance with claim 17 wherein said coplanar terminal members are arranged in mutually spaced relationship in a generally radial array for mechanically supporting a semiconductor device within said cavity.

21. A unitary package and connector unit in accordance with claim 20 wherein said terminal members are supported at least partially embedded in the encapsulation material at the base of said cavity and the semiconductor device is disposed directly on said terminal members to effect direct electrical contact with preselected areas of said semiconductor device, and closure means sealingly disposed within said cavity.

22. An electronic device package and connector unit comprising a plurality of spaced lead members including inner ends defining a plurality of coplanar terminal members adapted to be connected to an electronic device and outer ends terminating in enlarged shoulder members, said shoulder members each including an integral flange depending therefrom, a nonconductive encapsulating material encapsulating said lead members, said encapsulation material having a selectively sealable cavity exposing said terminal members, and having an outer edge surface terminating at said shoulder members, a plurality of male connector pins rigidly secured to said flanges and terminating at their outer ends in aligned relationship spaced from said encapsulation material, said male connector pins being adapted for connection in an electronic system.

23. An electronic device package and connector unit in accordance with claim 22 wherein said shoulder members extend outwardly from the outer edge surface of said encapsulation material a predetermined distance sufficient to define a space intermediate the outer edge surface of said encapsulation material and said flanges, and the inner ends of said male connector pins are disposed within said space rigidly attached to the inwardly facing surfaces of said flanges and extending exteriorly of said encapsulation material.

24. An electronic device package and connector unit in accordance with claim 23 wherein said flanges depend generally perpendicular to said shoulder members forming an arcuate junction therewith.

25. An electronic device package and connector unit in accordance with claim 23 wherein said plurality of lead members are coplanar and extend into said encapsulation material from opposite directions, and said coplanar terminals members are arranged in spaced relationship to define a partially enclosed space adapted to accommodate the electronic device, said space being exposed by said cavity.

26. An electronic device package and connector unit in accordance with claim 25 wherein a semiconductor bonding pad is disposed within said space arranged spaced from said terminal members and supported by said encapsulation material at the base of said cavity spaced from the plane defined by said terminal members.

27. An electronic device package and connector unit in accordance with claim 26 wherein the electronic device comprises a semiconductor device supported on said bonding pad, said semiconductor device having a plurality of circuit elements at an exposed surface thereof, substantially flush with the plane defined by said terminal members, means electrically interconnecting said terminal members with preselected circuit elements, and sealant means disposed within said cavity.

28. An electronic device package and connector unit in accordance with claim 23 wherein said plurality of lead members are coplanar and extend into said encapsulation material from opposite directions and said terminals members are arranged in a generally radial configuration within said cavity and are at least partially embedded within said encapsulation material.

29. An electronic device package and connector unit in accordance with claim 28 wherein the electronic device comprises a semiconductor device having a plurality of circuit elements at a surface thereof, said semiconductor device being supported within said cavity with said surface in direct engagement with said terminals to effect electrical connections between said terminal members and preselected circuit elements, and a sealant plug is sealingly disposed within said cavity.

* * * * *